United States Patent
Singhal et al.

(10) Patent No.: US 10,070,392 B1
(45) Date of Patent: Sep. 4, 2018

(54) SYSTEM, METHOD, AND COMPUTER PROGRAM FOR INTELLIGENT DEVICE CONNECTION MANAGEMENT

(71) Applicant: Amdocs Development Limited, Limassol (CY)

(72) Inventors: Love Kumar Singhal, Delhi (IN); Sanjay Bhatia, Pune (IN)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 0 days.

(21) Appl. No.: 15/194,455

(22) Filed: Jun. 27, 2016

Related U.S. Application Data

(60) Provisional application No. 62/184,720, filed on Jun. 25, 2015.

(51) Int. Cl.
*H04W 52/02* (2009.01)
*H04W 4/02* (2018.01)
*H04W 4/14* (2009.01)

(52) U.S. Cl.
CPC ....... *H04W 52/0258* (2013.01); *H04W 4/025* (2013.01); *H04W 4/14* (2013.01); *H04M 2250/10* (2013.01)

(58) Field of Classification Search
CPC ......... H04W 4/14; H04W 4/00; H04W 36/00; H04W 8/18; H04W 12/08; H04W 88/06;
(Continued)

(56) References Cited

U.S. PATENT DOCUMENTS 8,023,522 B2   9/2011 Gobriel et al.

2009/0305699 A1* 12/2009 Deshpande ........... H04W 48/16
455/434
(Continued)

FOREIGN PATENT DOCUMENTS

EP            2557859 A1    2/2013
WO      2009127873 A1   10/2009
WO      2013082628 A2    6/2013

OTHER PUBLICATIONS

"Google Nexus 5—WiFi Battery drain on standby," AANDROIDPIT, Android Forum, 2014, pp. 1-2, retrieved from www.androidpit.com/forum/587395/google-nexus-5-wifi-battety-drain-on-standby.
"Does your battery drain fast on Wifi?" Android Central Forums, 2013, pp. 1-5, retrieved from http://forums.androidcentral.com/htc-one/299520-does-your-battery-drain-fast-wifi.html.
(Continued)

*Primary Examiner* — Pablo Tran
(74) *Attorney, Agent, or Firm* — Zilka-Kotab, P.C.

(57) ABSTRACT

A system, method, and computer program product are provided for intelligent device connection management. In use, an instruction is received from a first device to turn on at least one first transceiver associated with a second device, the at least one first transceiver associated with the second device being operable for accessing at least one first communication network for communicating with the first device. Additionally, a communication is sent to the second device requesting that the second device turn on the at least one first transceiver such that the second device is operable for accessing the at least one first communication network for communicating with the first device, the communication being sent over at least one second communication network associated with at least one second transceiver corresponding to the second device.

3 Claims, 8 Drawing Sheets

(58) Field of Classification Search
CPC ... H04W 4/02; H04W 48/20; H04W 52/0258; H04W 4/025; H04M 2250/10; H04M 1/66; H04M 1/00; H04B 1/38; H04L 12/2807; H04L 12/2836; H04L 63/101; H04L 63/104; H04L 2012/2841
See application file for complete search history.

(56) References Cited

U.S. PATENT DOCUMENTS

| | | | | |
|---|---|---|---|---|
| 2010/0234017 | A1* | 9/2010 | Lim | H04L 12/2807 455/426.1 |
| 2011/0312333 | A1* | 12/2011 | I'Anson | H04W 8/245 455/456.1 |
| 2013/0331054 | A1 | 12/2013 | Kodali | |

OTHER PUBLICATIONS

Angove, A., "Disable WiFi scanning to extend battery life, for Android," Jul. 21, 2014, pp. 1-7, retrieved from www.whistleout.com.au/MobilePhones/Guides/Disable-WiFi-scanning-to-extend-battery-life-for-Android.

Smith, C., "iOS 8 is already causing Wi-Fi and battery drain issues," Sep. 23, 2014, pp. 1-5, retrieved from http://bgr.com/2014/09/23/ios-8-wi-fi-and-battery-drain-issues/.

"Does having wifi always on drain your battery more?," MacRumors Forum, 2011, pp. 1-12, retrieved from http://forums.macrumors.com/showthread.php?t=1396891.

Sun, L. et al., "Modeling WiFi Active Power/Energy Consumption in Smartphones," Distributed Computing Systems (ICDCS), 2014 IEEE 34th International Conference on, Madrid, 2014, pp. 41-51.

\* cited by examiner

US 10,070,392 B1

SYSTEM, METHOD, AND COMPUTER PROGRAM FOR INTELLIGENT DEVICE CONNECTION MANAGEMENT

CLAIM OF PRIORITY

This application claims the benefit of U.S. Provisional Application No. 62/184,720, filed Jun. 25, 2015, the entire contents of which are incorporated herein by reference.

FIELD OF THE INVENTION

The present invention relates to communication networks, and more particularly to efficiently accessing such communication networks.

BACKGROUND

Mobile devices often use multiple radio access technologies. For example, such technologies include Wi-Fi, Bluetooth, Wi-Fi Direct, and USB Wireless, etc. In addition, the technologies may include cellular technologies (e.g. 2G, 3G, 4G, etc.). The multiple radio access technologies in mobile devices cause a high energy drain on the mobile devices, even while idle. Additionally, constant communication between the mobile devices and personal access points using these radio access technologies cause a high energy drain on the personal access points.

There is thus a need for addressing these and/or other issues associated with the prior art.

SUMMARY

A system, method, and computer program product are provided for intelligent device connection management. In use, an instruction is received from a first device to turn on at least one first transceiver associated with a second device, the at least one first transceiver associated with the second device being operable for accessing at least one first communication network for communicating with the first device. Additionally, a communication is sent to the second device requesting that the second device turn on the at least one first transceiver such that the second device is operable for accessing the at least one first communication network for communicating with the first device, the communication being sent over at least one second communication network associated with at least one second transceiver corresponding to the second device.

DETAILED DESCRIPTION

Figure 1:
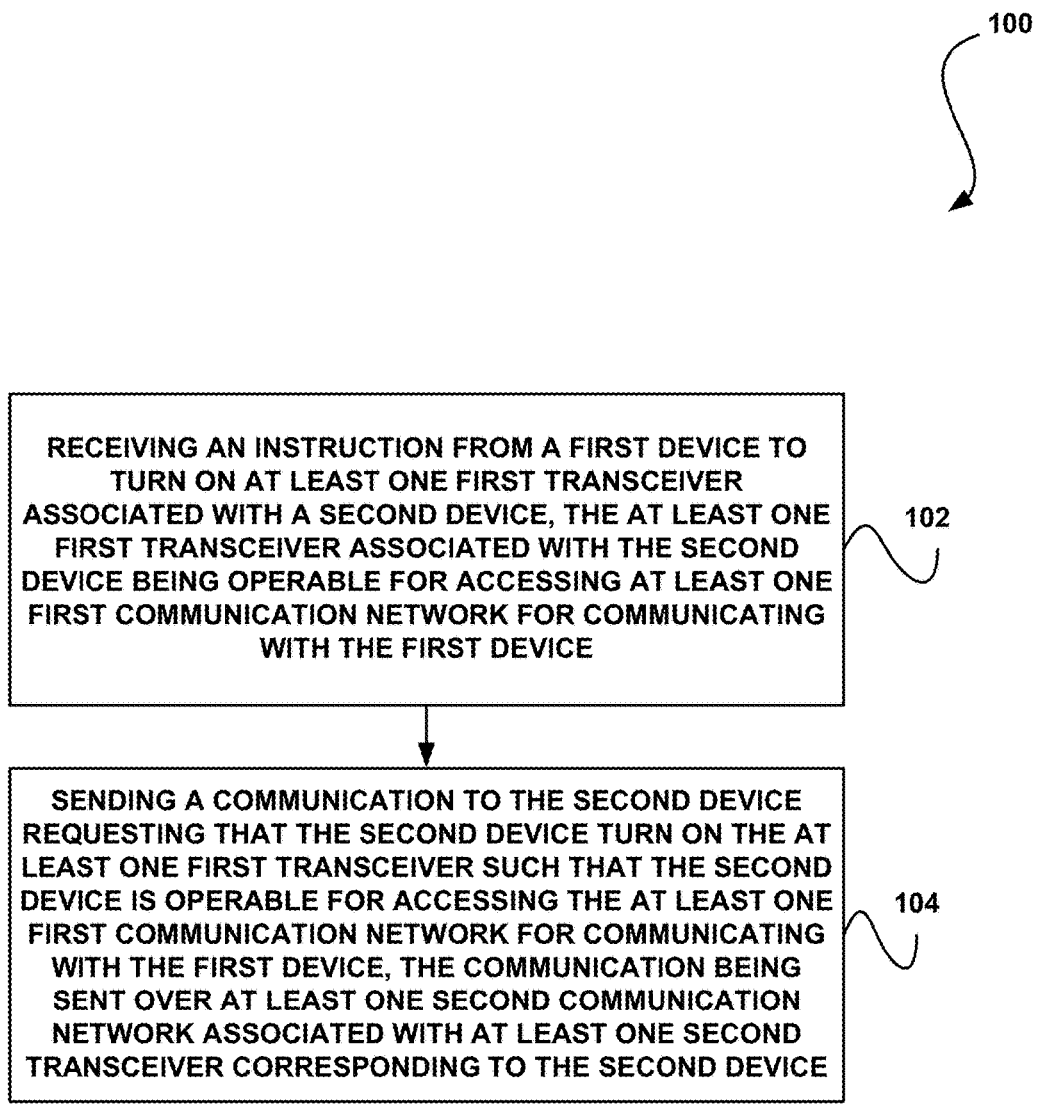
FIG. 1 illustrates a method for intelligent device connection management, in accordance with one embodiment.

FIG. 1 illustrates a method 100 for intelligent device connection management, in accordance with one embodiment.

As shown, an instruction is received from a first device to turn on at least one first transceiver associated with a second device. See operation 102. The at least one first transceiver associated with the second device is operable for accessing at least one first communication network for communicating with the first device.

Additionally, a communication is sent to the second device requesting that the second device turn on the at least one first transceiver such that the second device is operable for accessing the at least one first communication network for communicating with the first device. See operation 104. The communication is sent over at least one second communication network associated with at least one second transceiver corresponding to the second device.

The first and second communication networks are different types of networks such that the second communication network can be used to communicate with the second device to turn on a radio/transceiver for accessing the first communication network. The first and second communication network may include any type of communication network. For example, in various embodiments, the first or second communication network may include a Global System for Mobile Communications (GSM) network, an Enhanced Data rates for GSM Evolution (EDGE) network, a 3GPP UMTS network, a 3GPP based standardized access network a 3GPP2 based standardized access network, a Wi-Fi network, a Wi-Max network, a Wireless-USB network, a Bluetooth network, Wireline networks (e.g. Ethernet 802.3, etc.), LiFi Networks and/or any other type of network.

Moreover, the transceiver and associated functionality of the device that is turned on and off may be associated with any corresponding communication network. Turning on the transceiver refers to putting the transceiver (e.g. and associated infrastructure, functionality, etc.) in an operational state (e.g. from a non-functional state, an off state, etc.). Turning off the transceiver may refer to powering off the transceiver and/or putting the transceiver and associated infrastructure in a mode that utilizes less energy than a "turned on" state.

Thus, the method 100 provides an effective and energy efficient automated radio management technique to address energy drain on devices. The method 100 may be implemented to significantly reduce the energy consumption of mobile devices, etc.

The first and second device may include any type of device, such as a mobile phone, a computer (e.g. a notebook computer, a tablet computer, etc.), a media device, a network device, and/or any other type of device.

Further, the communication sent to the second device may include various communications associated with various networks. For example, the communication being sent over the second communication network may include a Short Message Service (SMS) message. As another example, the communication being sent over the second communication network may include an Unstructured Supplementary Service Data (USSD) message. As another example, the communication being sent over the second communication network may include a paging indication.

Additionally, in one embodiment, the instruction from the first device may be received over the second communication network. In another embodiment, the instruction from the first device may be received over a third communication network. In this case, the third communication network may be different from the first and second communication network. Further, in one embodiment, the method 100 may include translating the instruction received from the first device over the third communication network into the communication to be sent over the second communication network.

Once the second device receives the instruction to turn on the transceiver, the second device may determine to turn on the transceiver based on a variety of criteria. For example, the second device may utilize location based information to determine whether to turn on the first transceiver such that the second device is operable for accessing the first communication network for communicating with the first device. In this case, the second device may utilize the location based information to determine whether a location of the second device is associated with a known desired geographical area for accessing the first communication network. The second device may turn on the first transceiver for accessing the first communication network when it is determined that the location is associated with the known desired geographical area.

The location may be determined in a variety of ways. For example, in one embodiment, the location may be determined utilizing location information obtained by a Cell Identifier. In this case, the Cell Identifier may be determined utilizing a subscriber identity module (SIM) of the mobile device.

In another embodiment, the location may be determined utilizing global positioning system (GPS) information. In this case, the GPS information may be determined utilizing GPS functionality of the mobile device. It should be noted that, the device does not need to keep an associated GPS receiver "ON" all of the time. The device may use a combination of Cell-IDs and a GPS technique to turn on GPS measurements only when the device is in known Cell-ID locations (e.g. where the services of a particular access point have been used in the past, etc.).

It should be noted that GPS may refer to any present and future geographical positioning system capable of facilitating geographical positioning in various countries, such as geographical positioning systems provided by countries including the United States (GPS), Russia (GLONASS), the European Union (GNSS), India (IRNSS), India (NAVIC), and China (BEIDOU), etc. GPS may also refer to Assisted-GPS (A-GPS), and Assisted-GLONASS (A-GLONASS), etc.

In another embodiment, the location may be determined utilizing network assisted location information. The network assisted location information may include any location information provided by the network.

Of course, in various embodiments, the location may be determined utilizing any combination of techniques.

The known desired geographical area may include any area, building, city, and/or any other type of geographical area. Additionally, the known desired geographical area may be associated with one or more access points. Moreover, the known desired geographical area may be associated with any location where the device has previously accessed the communication network, or otherwise is familiar with the communication network.

For example, the known desired geographical area for accessing the communication network may be determined based on the device accessing the communication network for a first time from a first location (i.e. on a prior occasion). In this case, the known desired geographical area may be stored in memory of the device.

Further, the device may access the memory to determine whether a current location of the device is within the desired geographical area. In this case, the transceiver of the mobile device (and, in one embodiment, associated infrastructure, etc.) may be turned on for accessing the communication network if it is determined that the current location of the device is within the desired geographical area.

The Internet of Things (IOT) describes many millions of devices that interconnect and exchange information between them. The method 100 allows for implementation of a framework for cost effective automatic communication between devices having multiple access technologies. This includes all current/future wireline and wireless technologies as well as all current/future light based technology such as "LiFi".

Implementation of the method 100 allows for a system to utilize a communication channel common to all the devices for communicating control signals for all technologies that are in an idle or switched-off state. In addition, such techniques may be utilized to support scenarios when such common control channel is not available by using a translation agent.

The interconnections of multiple access devices present in mobile devices, etc. causes high energy drain even while idle (waiting). The method 100 provides an effective and energy efficient automated radio management to address the energy drain of devices. These techniques significantly reduce the energy consumption on the mobile device and also allows for intelligent automated decisions to turn on required infrastructure for enabling communication using a preferred technology.

In addition, these techniques significantly reduce the energy consumption for personal access points. For example, such techniques offer the independence from having to switch on/off personal access points for communication using that access point, thus making the entire communication automated over that radio which is serviced by that access point. This allows for automated connection over a desired radio/transceiver by automated enabling of infrastructure to communicate over that transceiver/radio-technology.

It should be noted that the method 100 may be implemented utilizing various systems, hardware, software, applications, user interfaces, etc., as dictated by the implementer. More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Although examples and embodiments herein may be described in the context of a particular technology, the techniques apply to any of the available multiple radio technologies or future multiple radio technologies (e.g. cellular technologies such as GSM, EDGE, 3GPP UMTS, LTE, and Wi-Fi, WiMAX, Wireless-USB, Bluetooth, etc.)

and/or current and future wireline technologies (for example IEEE 802.3) as well as all current/future light based technology such as "LiFi".

Figure 2:
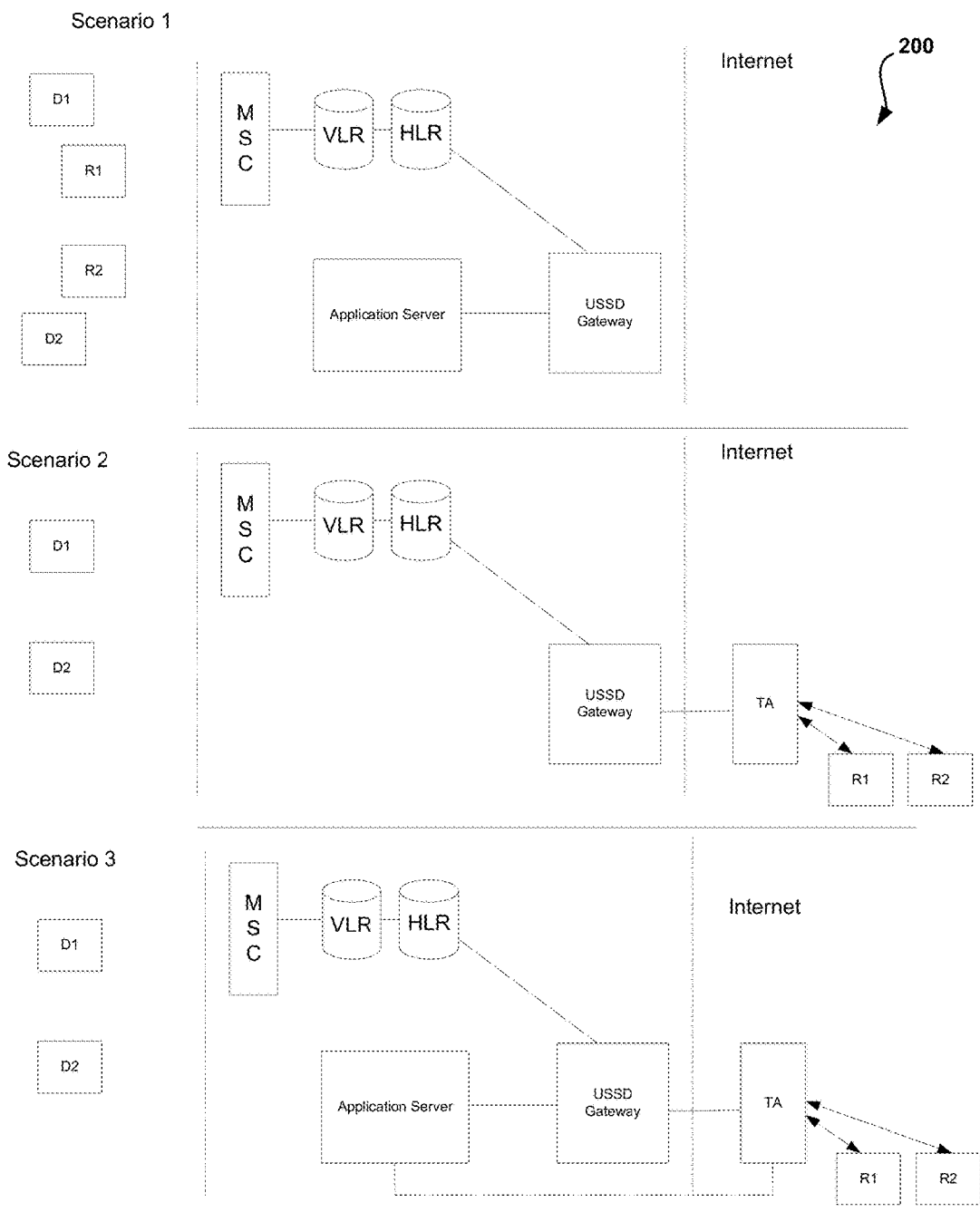
FIG. 2 illustrates a system diagram with various scenarios for intelligent device connection management, in accordance with one embodiment.

FIG. 2 illustrates a system diagram 200 with various scenarios for intelligent device connection management, in accordance with one embodiment. As an option, the system diagram 200 may be implemented in the context of the details of the previous Figure. Of course, however, the system diagram 200 may be implemented in the context of any desired environment. Further, the aforementioned definitions may equally apply to the description below.

As shown, FIG. 2 shows three different scenarios for intelligent device connection management. In these scenarios, a USSD based intelligent connection manager is described. In the context of the present description, R1 and R2 refer to the devices providing radio connectivity to client devices. For example, in the case of Wi-Fi technology, R1 and/or R2 may be a WLAN AP, a WAG, a router, etc., within a communication reach of D1 and D2 respectively. D1 and D2 refer to multiple radio devices and a calling/called party respectively. A security association exists between D1 and R1, and between D2 and R2.

Further, TA refers to a translation agent that translates the USSD message (or any other message) received via USSD GW to an IP message command. Each WLAN AP, WAG, and/or router, etc., registers itself and its authorized clients with the TA. The TA maintains an association, such as an IP address of R1, R2, and the service client's MSISDN numbers for R1 and R2. Of course, utilizing the service client's MSISDN numbers is only one example for identifying the devices, as various techniques for identifying the devices may be utilized.

In the first scenario, a cellular network's USSD services are used for state transition of all other communication technologies, for one of the specific cases of Wi-Fi.

In this case, an application server receives the USSD message from the initiating device D1, interprets the message, and sends another USSD message to the device D2 instructing D2 to switch-on a target radio (Wi-Fi in this example). In case of Wi-Fi, USSD messages in turn will be used to switch-on routing devices R1 and R2 if so desired by D1 and D2. In particular, D1 and/or D2 may use stored information to determine where to expect R1/R2 radio signals. In one embodiment, D1 and/or D2 can make the decision to switch on these devices on the basis of location information and whether it detects radio signals at that location.

The location information may include any information associated with location. Additionally, the location may be determined in a variety of ways. For example, in one embodiment, the location may be determined utilizing location information obtained by a Cell Identifier. In this case, the Cell Identifier may be determined utilizing a subscriber identity module (SIM) of the device.

In another embodiment, the location may be determined utilizing GPS information. In this case, the GPS information may be determined utilizing GPS functionality of the device.

In another embodiment, the location may be determined utilizing network assisted location information. The network assisted location information may include any location information provided by the network. Of course, in various embodiments, the location may be determined utilizing any combination of techniques.

As one example, more information associated with location based intelligent radio state switching may be found in U.S. patent application Ser. No. 15/194,448, titled "SYSTEM, METHOD, AND COMPUTER PROGRAM FOR INTELLIGENT RADIO STATE SWITCHING FOR GEOGRAPHICALLY FIXED ACCESS POINTS", which is incorporated herein by reference in its entirety.

In the second scenario in FIG. 2, a cellular network's USSD services are used, along with a translation agent (TA), for state transition of all other communication technologies.

In this case, the application server receives the USSD message from the initiating device D1, interprets the message, and sends another USSD message to the device D2 instructing D2 to switch-on a target radio (Wi-Fi in this example). In case of Wi-Fi, the TA will translate the USSD message received from D1 and/or D2 into an encoded IP message carrying a command to switch-on radio on devices R1 and R2 if so desired by D1 and D2.

In this case, only the Wi-Fi radio is switched-off and R1/R2 can still receive messages on a WAN interface. In particular, D1 and/or D2 may use R1 to determine where to expect R1/R2 radio signals. In one embodiment, D1/D2 can make the decision to switch on these devices on the basis of location information and whether it detects radio signals at that location.

In the third scenario of FIG. 2, a cellular network's USSD services are used for state transition of all other communication technologies. This implementation utilizes a translation agent (TA) and/or application server to achieve this state translation. The TA can either be connected directly to a USSD gateway or to the application server.

In this case, the application server receives the USSD message from the initiating device D1, interprets the message, and sends another USSD message to the device D2 instructing D2 to switch-on the target radio (Wi-Fi in this case). In case of Wi-Fi, the TA will translate the USSD received from D1 and/or D2 into an encoded IP message carrying a command to switch-on radios for devices R1 and R2 if so desired by D1 and D2.

In this case, only the Wi-Fi radio is switched-off and R1/R2 can still receive messages on the WAN interface. However, if R1/R2 are switched off (no WAN interface, TA cannot reach R1/R2 using IP message), then the application server's USSD facility may be used to communicate a command to switch on R1/R2.

In all the above referenced scenarios, encryption techniques may be employed at various nodes to protect communication.

Figure 3:
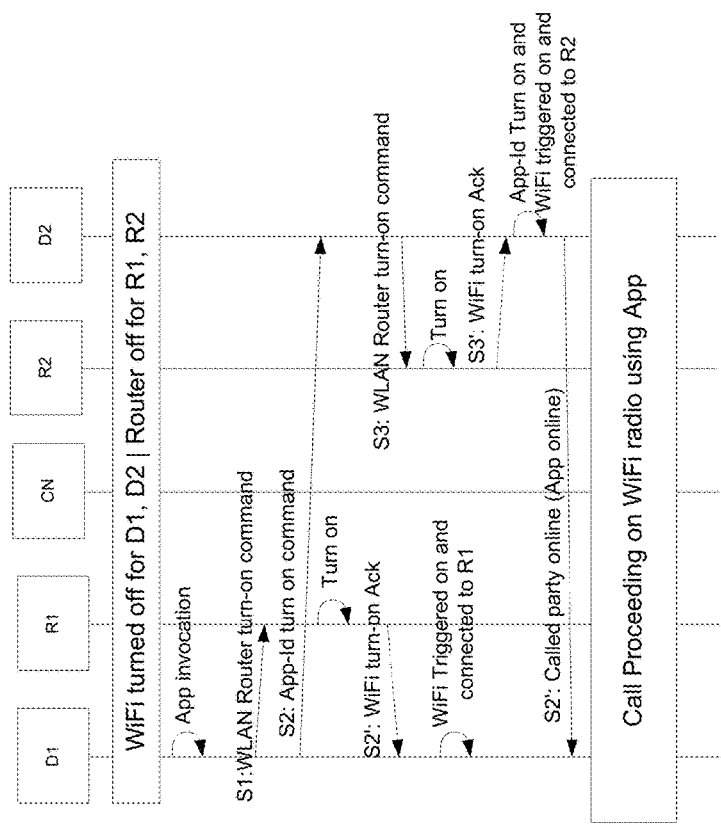
FIG. 3 illustrates a system flow diagram with a scenario for intelligent device connection management, in accordance with one embodiment.

FIG. 3 illustrates a system flow diagram 300 with a scenario for intelligent device connection management, in accordance with one embodiment. As an option, the system flow diagram 300 may be implemented in the context of the details of the previous Figures. Of course, however, the system flow diagram 300 may be implemented in the context of any desired environment. Further, the aforementioned definitions may equally apply to the description below.

As shown in FIG. 3, an SMS/USSD based intelligent connection manager is described. In the context of the present description, D1 refers to a multi-radio device that is the calling party. D2 refers to a multi-radio device that is the called party. R1 may be a WLAN AP, a WAG, a router, etc., within a communication reach of D1. R2 may be a WLAN AP, a WAG, a router, etc., within a communication reach of D2. A security association exists between R1 and D1, and between R2 and D2. S1, S2, and S3 may refer to SMS and/or USSD messages via a cellular control channel. Any common channel signaling techniques (e.g. USSD, SMS, etc.) may be used for communicating control information for all available access technologies.

In this scenario, a cellular network's control channels are used for state transition of all other communication technologies. In this specific example, an SMS and/or USSD of the cellular network is used for this purpose.

Figure 4:
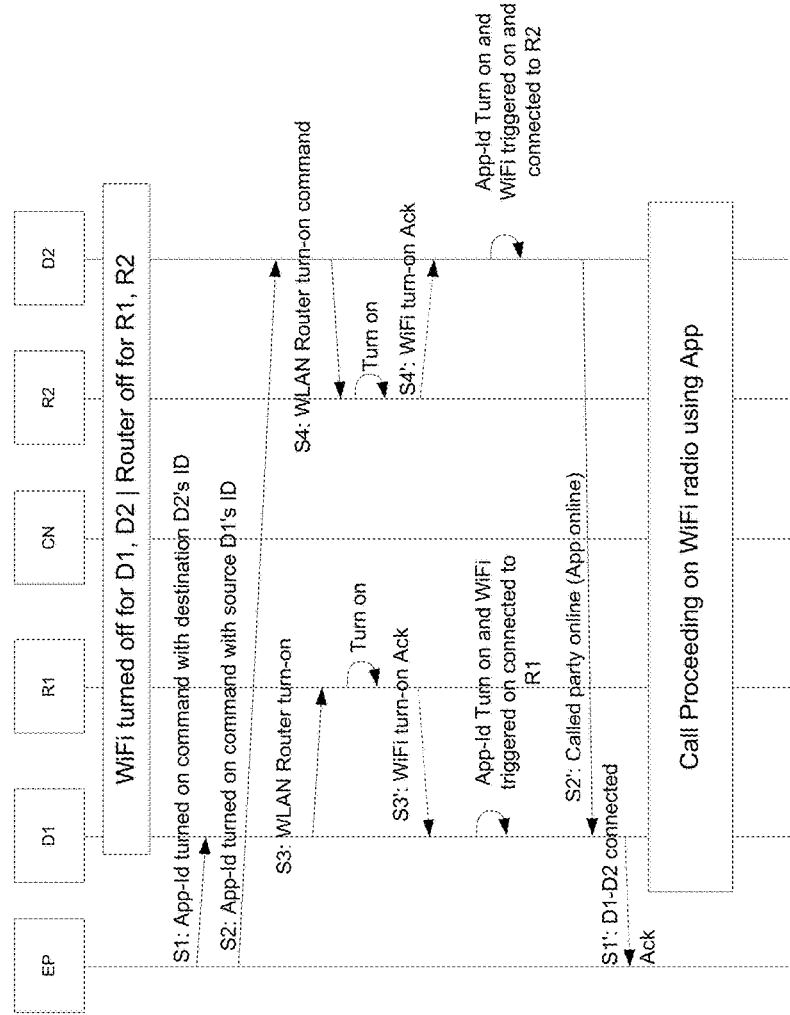
FIG. 4 illustrates a system flow diagram with a scenario for intelligent device connection management, in accordance with one embodiment.

FIG. 4 illustrates a system flow diagram 400 with a scenario for intelligent device connection management, in accordance with one embodiment. As an option, the system flow diagram 400 may be implemented in the context of the details of the previous Figures. Of course, however, the system flow diagram 400 may be implemented in the context of any desired environment. Further, the aforementioned definitions may equally apply to the description below.

As shown in FIG. 4, an SMS/USSD based intelligent connection manager is described. In the context of the present description, D1 refers to a multi-radio device that is the calling party. D2 refers to a multi-radio device that is the called party. R1 may be a WLAN AP, a WAG, a router, etc., within a communication reach of D1. R2 may be a WLAN AP, a WAG, a router, etc., within a communication reach of D2. A security association exists between R1 and D1, and between R2 and D2. S1, S2, S3 and S4 refer to SMS and/or USSD messages via a cellular control channel. Any common channel signaling techniques (e.g. USSD, SMS, etc.) may be used for communicating control information for all available access technologies.

In this scenario, a cellular network's control channels are used for state transition of all other communication technologies when the trigger is outside of both communicating devices. In this specific example, an SMS and/or USSD of cellular network is used for this purpose.

Figure 5:
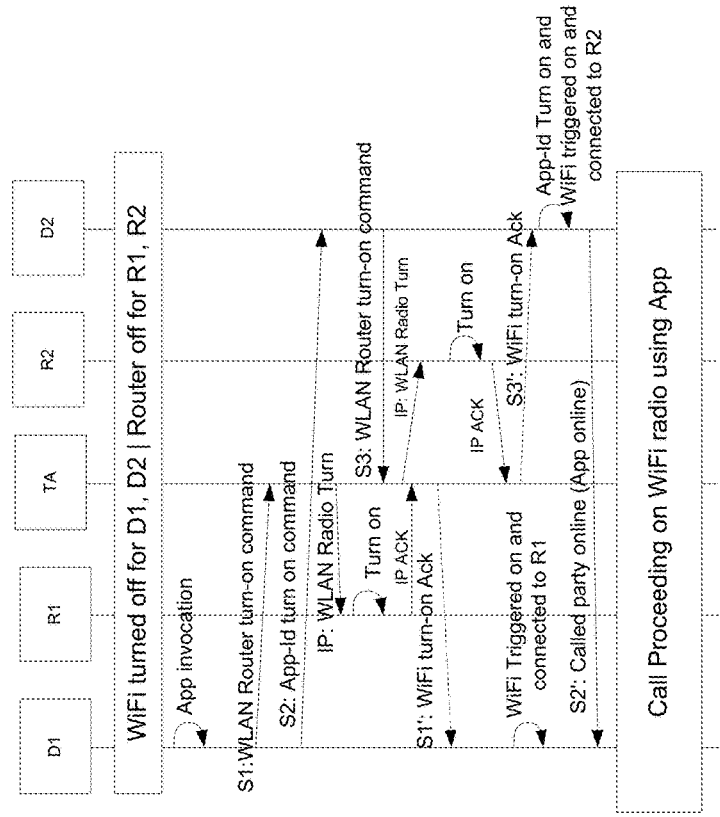
FIG. 5 illustrates a system flow diagram with a scenario for intelligent device connection management, in accordance with one embodiment.

FIG. 5 illustrates a system flow diagram 500 with a scenario for intelligent device connection management, in accordance with one embodiment. As an option, the system flow diagram 500 may be implemented in the context of the details of the previous Figures. Of course, however, the system flow diagram 500 may be implemented in the context of any desired environment. Further, the aforementioned definitions may equally apply to the description below.

As shown in FIG. 5, an SMS/USSD based intelligent connection manager is described. In the context of the present description, D1 refers to a multi-radio device that is the calling party. D2 refers to a multi-radio device that is the called party. R1 may be a WLAN AP, a WAG, a router, etc., within a communication reach of D1. R2 may be a WLAN AP, a WAG, a router, etc., within a communication reach of D2. A security association exists between R1 and D1, and between R2 and D2. S1, S2, and S3 refer to SMS and/or USSD messages via a cellular control channel.

The TA refers to a translation agent that translates the SMS message to an IP message command in case the SMS mechanism is used, or otherwise translates the message received from the USSD-gateway to an IP message command if USSD is used. Each WLAN AP, WAG, and/or router, etc., registers itself and its authorized clients with the TA. The TA maintains an association, such as an IP address of R1, R2, and the service client's MSISDN numbers for R1 and R2 respectively.

In this scenario, a cellular network's control channels are used for state transition of all other communication technologies using a translation agent. In the specific example, an SMS and/or USSD of cellular network is used for this purpose. Any common channel signaling techniques (e.g. USSD, SMS, etc.) may be used for communicating control information for all available access technologies.

Figure 6:
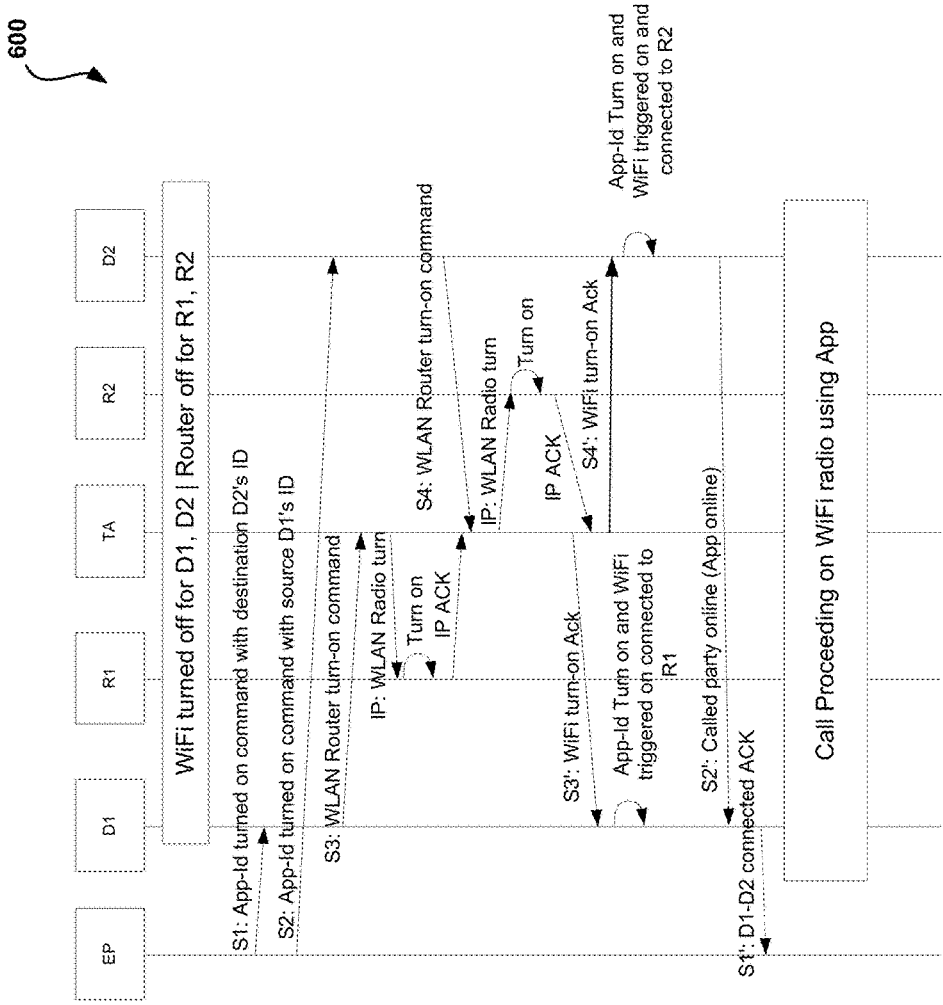
FIG. 6 illustrates a system flow diagram with a scenario for intelligent device connection management, in accordance with one embodiment.

FIG. 6 illustrates a system flow diagram 600 with a scenario for intelligent device connection management, in accordance with one embodiment. As an option, the system flow diagram 600 may be implemented in the context of the details of the previous Figures. Of course, however, the system flow diagram 600 may be implemented in the context of any desired environment. Further, the aforementioned definitions may equally apply to the description below.

As shown in FIG. 6, an external trigger based intelligent connection manager is described. This implementation may use any common channel signaling method (e.g. USSD, SMS, etc.) for communicating control information for all available access technologies.

In the context of the present description, D1 refers to a multi-radio device that is the calling party. D2 refers to a multi-radio device that is the called party. R1 may be a WLAN AP, a WAG, a router, etc., within a communication reach of D1. R2 may be a WLAN AP, a WAG, a router, etc., within a communication reach of D2. A security association exists between R1 and D1, and between R2 and D2. S1, S2, S3 and S4 refer to SMS and/or USSD messages via a cellular control channel. Any common channel signaling techniques (e.g. USSD, SMS, etc.) may be used for communicating control information for all available access technologies.

The TA refers to a translation agent that translates the SMS to an IP message command in case the SMS mechanism is used, or otherwise translates the message received from the USSD-gateway to an IP message command, if USSD is used. Each WLAN AP, WAG, and/or router, etc., registers itself and its authorized clients with the TA. The TA maintains an association, such as an IP address of R1, R2, and the service client's MSISDN numbers for R1 and R2 respectively.

In this scenario, a cellular network's control channels are used for state transition of all other communication technologies using a translation agent when the trigger is outside of both communicating devices. In this specific example, an SMS/USSD message of cellular network is used for this purpose.

In all the above scenarios, encryption techniques can be employed at various nodes to protect communication.

In response to a USSD message or an SMS message, only a paging indication is sent to the passive target devices (Wi-Fi Routers R1/R2) without intention of any further processing by the network. In some cases, this may require some modification in the paging mechanism at the cellular system which enables the TA to initiate paging to R1/R2. Upon receiving the paging indication, passive target devices (e.g. Wi-Fi Routers R1/R2) will take this as a command and turn the Wi-Fi device on.

In all the scenarios described herein, location information may be used to determine where to expect access point radio/LiFi signals. Mobile devices can make the decision to switch on these devices on the basis of location information.

The techniques described herein use intelligent automated decisions to turn on required infrastructure for enabling communication using a preferred technology. This provides an effective and energy efficient automated radio management, thereby significantly reducing the energy consumption and radiations on the interconnected devices.

Figure 7:
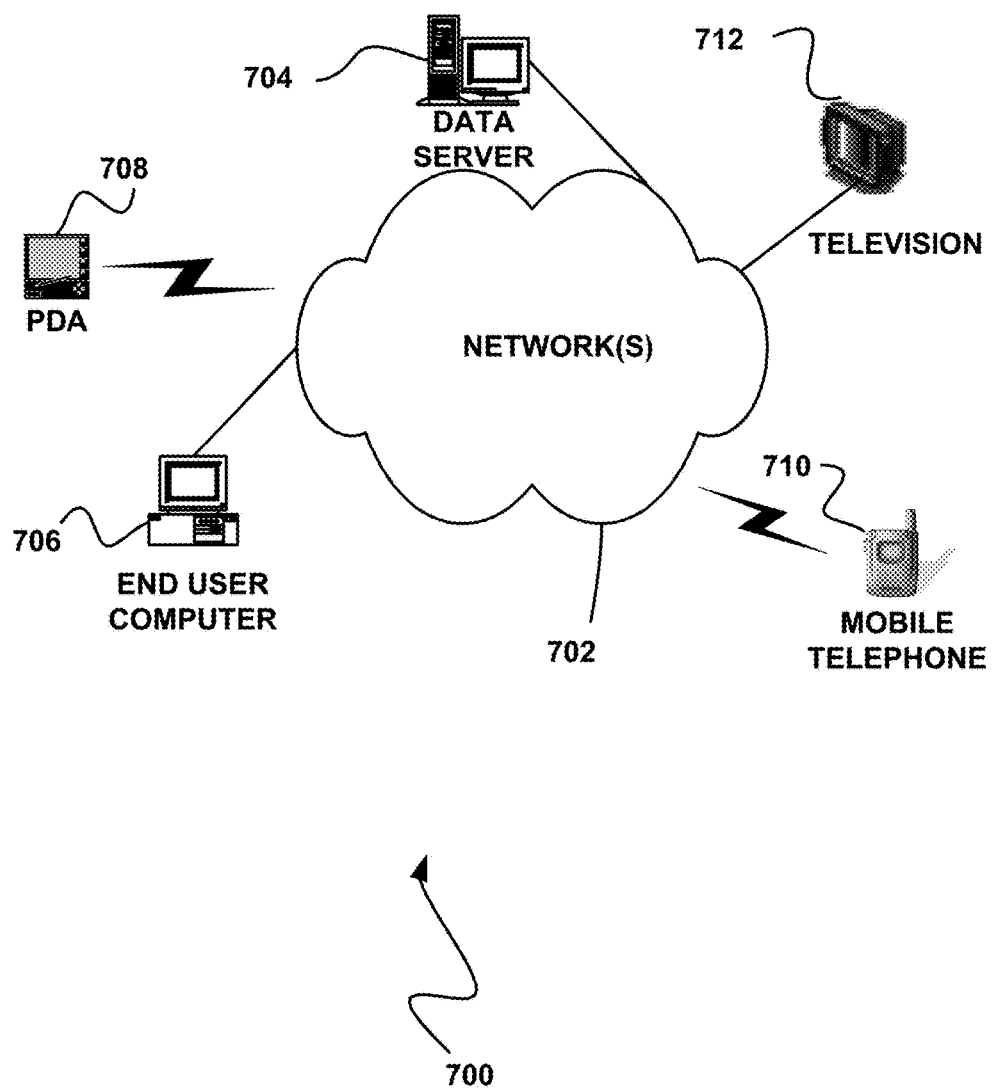
FIG. 7 illustrates a network architecture, in accordance with one possible embodiment.

FIG. 7 illustrates a network architecture 700, in accordance with one possible embodiment. As shown, at least one network 702 is provided. In the context of the present network architecture 700, the network 702 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 702 may be provided.

Coupled to the network 702 is a plurality of devices. For example, a server computer 704 and an end user computer 706 may be coupled to the network 702 for communication purposes. Such end user computer 706 may include a desktop computer, lap-top computer, and/or any other type of logic. Still yet, various other devices may be coupled to the network 702 including a personal digital assistant (PDA) device 708, a mobile phone device 710, a television 712, etc.

Figure 8:
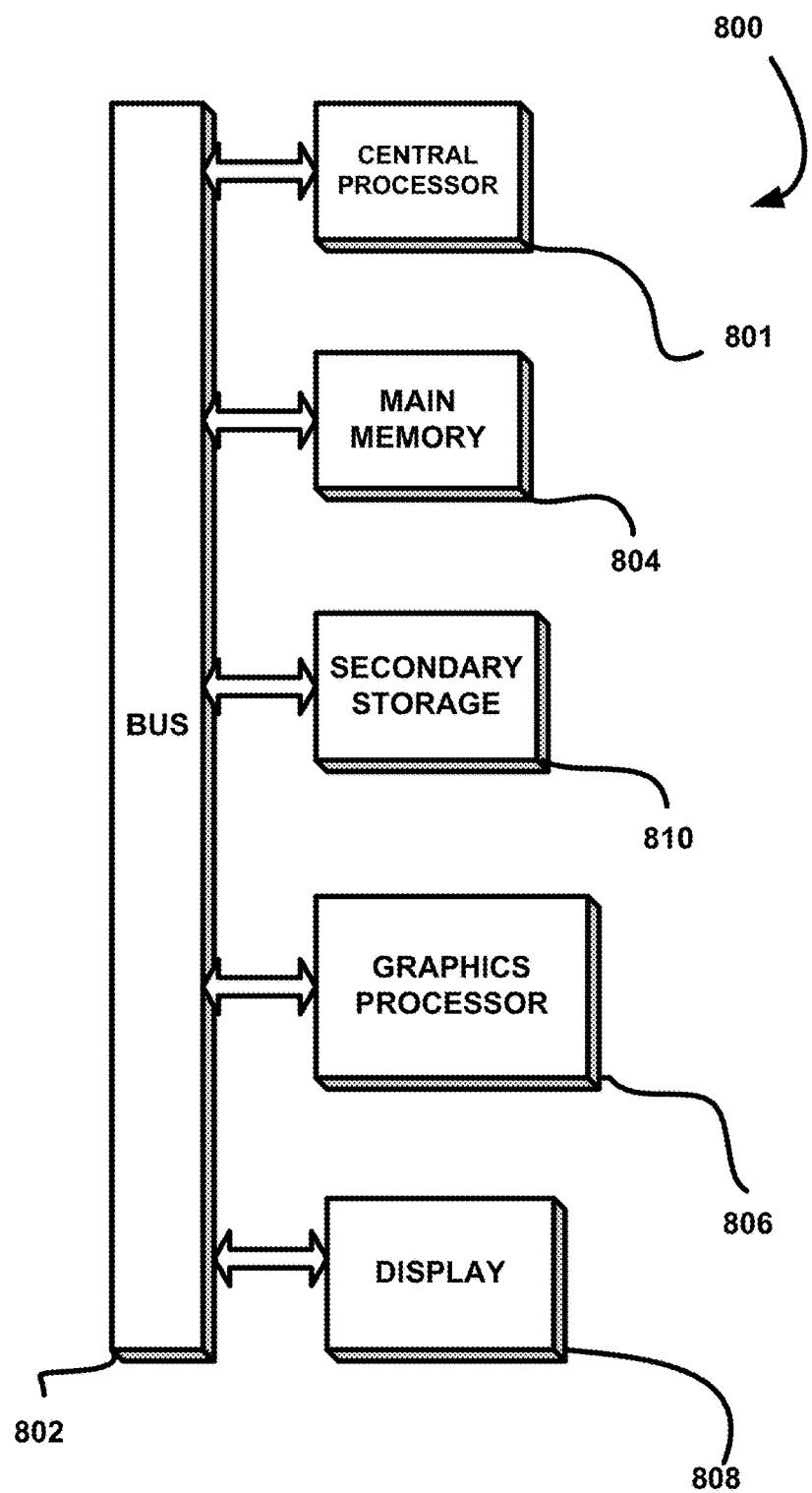
FIG. 8 illustrates an exemplary system, in accordance with one embodiment.

FIG. 8 illustrates an exemplary system 800, in accordance with one embodiment. As an option, the system 800 may be implemented in the context of any of the devices of the network architecture 700 of FIG. 7. Of course, the system 800 may be implemented in any desired environment.

As shown, a system 800 is provided including at least one central processor 801 which is connected to a communication bus 802. The system 800 also includes main memory 804 [e.g. random access memory (RAM), etc.]. The system 800 also includes a graphics processor 806 and a display 808.

The system 800 may also include a secondary storage 810. The secondary storage 810 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 804, the secondary storage 810, and/or any other memory, for that matter. Such computer programs, when executed, enable the system 800 to perform various functions (as set forth above, for example). Memory 804, storage 810 and/or any other storage are possible examples of tangible computer-readable media.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A computer program product embodied on a non-transitory computer readable medium, comprising:
   computer code for maintaining, by a server, a registration of a first access point and authorized clients of the first access point, the authorized clients of the first access point including a first device within a communication reach of the first access point;
   computer code for maintaining, by the server, a registration of a second access point and authorized clients of the second access point, the authorized clients of the second access point including a second device within a communication reach of the second access point;
   computer code for enabling, by the server, communication between the first device and the second device via the first access point and the second access point by:
      receiving, by the server, a first short message service (SMS) instruction from the first device to turn on at least one first transceiver of the first access point, the at least one first transceiver being operable for accessing at least one first communication network for directly communicating with the first device;
      translating, by the server, the first SMS instruction received from the first device into a first encoded internet protocol (IP) message carrying a command to turn on the at least one first transceiver;
      responsive to the first SMS instruction, sending, by the server, the first encoded IP message to the first access point commanding that the first access point turn on the at least one first transceiver such that the first access point is operable for accessing the at least one first communication network for communicating with the first device;
      receiving, by the server, a second SMS instruction from the second device to turn on at least one second transceiver of the second access point, the at least one second transceiver being operable for accessing at least one second communication network for directly communicating with the second device, wherein the second device sends the second SMS message to the server responsive to receiving a command from the first device;
      translating, by the server, the second SMS instruction received from the second device into a second encoded IP message carrying a command to turn on the at least one second transceiver;
      responsive to the second SMS instruction, sending, by the server, the second encoded IP message to the second access point commanding that the second access point turn on the at least one second transceiver such that the second access point is operable for accessing the at least one second communication network for communicating with the second device;
   wherein once the first access point and the second access point are turned on utilizing the first encoded IP message and the second encoded IP message, respectively, the first device and the second device communicate via the first access point and the second access point.

2. A method, comprising:
   maintaining, by a server, a registration of a first access point and authorized clients of the first access point, the authorized clients of the first access point including a first device within a communication reach of the first access point;
   maintaining, by the server, a registration of a second access point and authorized clients of the second access point, the authorized clients of the second access point including a second device within a communication reach of the second access point;
   enabling, by the server, communication between the first device and the second device via the first access point and the second access point by:
      receiving, by the server, a first short message service (SMS) instruction from the first device to turn on at least one first transceiver of the first access point, the at least one first transceiver being operable for accessing at least one first communication network for directly communicating with the first device;
      translating, by the server, the first SMS instruction received from the first device into a first encoded internet protocol (IP) message carrying a command to turn on the at least one first transceiver;
      responsive to the first SMS instruction, sending, by the server, the first encoded IP message to the first access point commanding that the first access point turn on the at least one first transceiver such that the first access point is operable for accessing the at least one first communication network for communicating with the first device;
      receiving, by the server, a second SMS instruction from the second device to turn on at least one second transceiver of the second access point, the at least one second transceiver being operable for accessing at least one second communication network for directly communicating with the second device, wherein the second device sends the second SMS message to the server responsive to receiving a command from the first device;
      translating, by the server, the second SMS instruction received from the second device into a second encoded IP message carrying a command to turn on the at least one second transceiver;
      responsive to the second SMS instruction, sending, by the server, the second encoded IP message to the second access point commanding that the second access point turn on the at least one second transceiver such that the second access point is operable for accessing the at least one second communication network for communicating with the second device;

wherein once the first access point and the second access point are turned on utilizing the first encoded IP message and the second encoded IP message, respectively, the first device and the second device communicate via the first access point and the second access point.

3. A system comprising:

a memory system of a server; and one or more processing cores of the server coupled to the memory system and that are each configured to:

maintain a registration of a first access point and authorized clients of the first access point, the authorized clients of the first access point including a first device within a communication reach of the first access point;

maintain a registration of a second access point and authorized clients of the second access point, the authorized clients of the second access point including a second device within a communication reach of the second access point;

enable communication between the first device and the second device via the first access point and the second access point by:

receiving a first short message service (SMS) instruction from the first device to turn on at least one first transceiver of the first access point, the at least one first transceiver being operable for accessing at least one first communication network for directly communicating with the first device;

translating the first SMS instruction received from the first device into a first encoded internet protocol (IP) message carrying a command to turn on the at least one first transceiver;

responsive to the first SMS instruction, sending the first encoded IP message to the first access point commanding that the first access point turn on the at least one first transceiver such that the first access point is operable for accessing the at least one first communication network for communicating with the first device;

receiving, by the server, a second SMS instruction from the second device to turn on at least one second transceiver of the second access point, the at least one second transceiver being operable for accessing at least one second communication network for directly communicating with the second device, wherein the second device sends the second SMS message to the server responsive to receiving a command from the first device;

translating, by the server, the second SMS instruction received from the second device into a second encoded IP message carrying a command to turn on the at least one second transceiver;

responsive to the second SMS instruction, sending, by the server, the second encoded IP message to the second access point commanding that the second access point turn on the at least one second transceiver such that the second access point is operable for accessing the at least one second communication network for communicating with the second device;

wherein once the first access point and the second access point are turned on utilizing the first encoded IP message and the second encoded IP message, respectively, the first device and the second device communicate via the first access point and the second access point.

* * * * *